Figure 1:
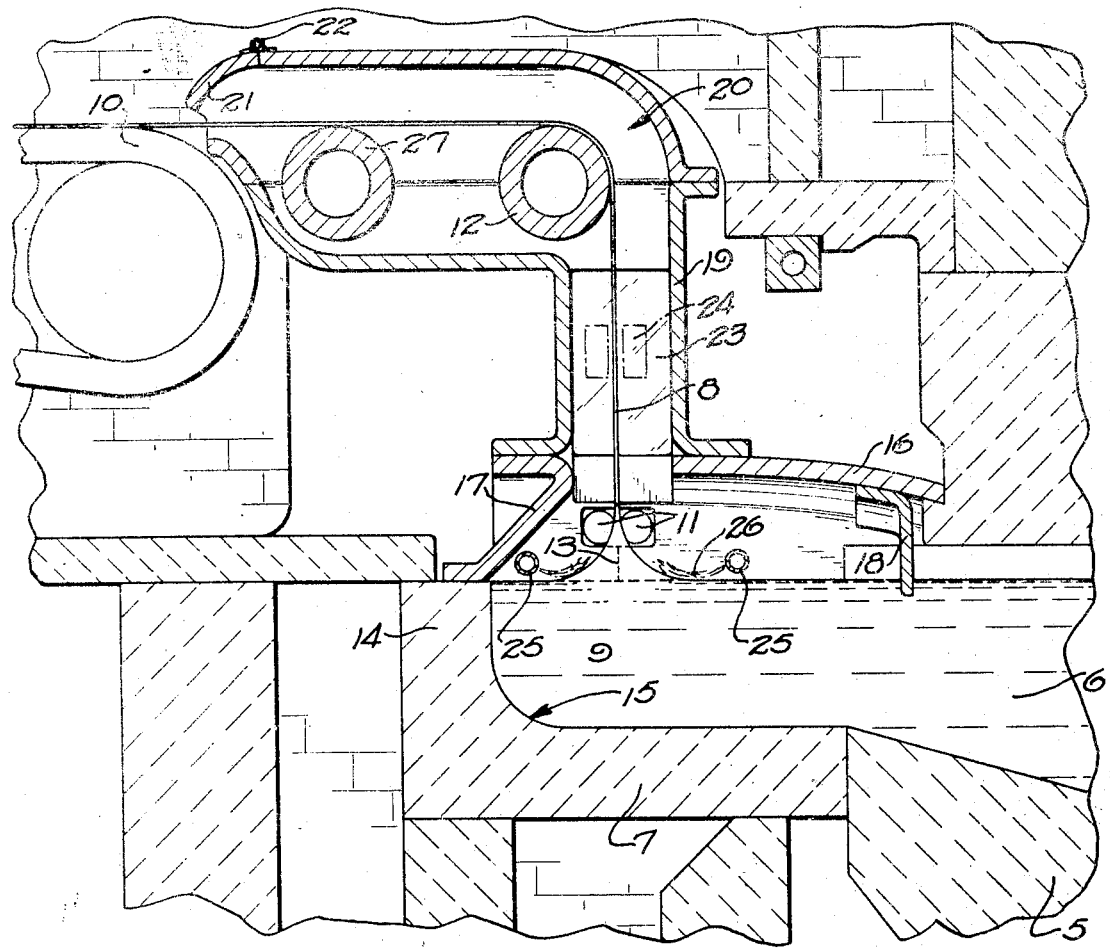

Sept. 8, 1931.  L. MAMBOURG  1,822,704

SHEET GLASS PRODUCING APPARATUS

Filed Sept. 20, 1926

Inventor
Leopold Mambourg.
By Frank Fraser,
Attorney

Patented Sept. 8, 1931

1,822,704

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

SHEET GLASS PRODUCING APPARATUS

Application filed September 20, 1926. Serial No. 136,458.

The present invention relates to sheet glass apparatus.

An important object of the invention is to provide a sheet glass apparatus wherein a sheet is produced in an enclosed chamber and permitted to become substantially set before it is subjected to contact with the atmosphere.

Another object of the invention is to provide in sheet glass apparatus a receptacle containing a mass of molten glass including means for drawing a sheet from said mass, and hood means arranged over the molten mass and extending in the general direction of the sheet to protect the same from the atmosphere.

Still another object of the invention is to provide an apparatus of this nature including a draw pot containing a mass of molten glass, means for drawing a sheet from said mass, and enclosed means for forming a compartment around the base of the sheet and the sheet proper during its formative period, the sheet being subjected to a fire polishing flame in said compartment.

A still further object of the invention is to provide a sheet forming apparatus wherein a sheet is continuously produced from a mass of molten glass, the mass being covered to prevent contact with the atmosphere, the covering also protecting the sheet until it has become substantially set, and means arranged between the covering and the molten glass to direct a fire polishing flame on said sheet, preferably at its base, in a manner that the flame can follow the sheet in its direction of draw.

A still further and important object of the invention is to provide an apparatus of this nature including a draw pot containing a mass of molten glass, means for drawing a sheet therefrom, and a deflecting member arranged between the draw pot and drawing means, the said sheet being protected from contact with the atmosphere from its point of formation to the drawing table.

Other objects and advantages of the invention will become apparent during the course of the following description.

Figure 2:
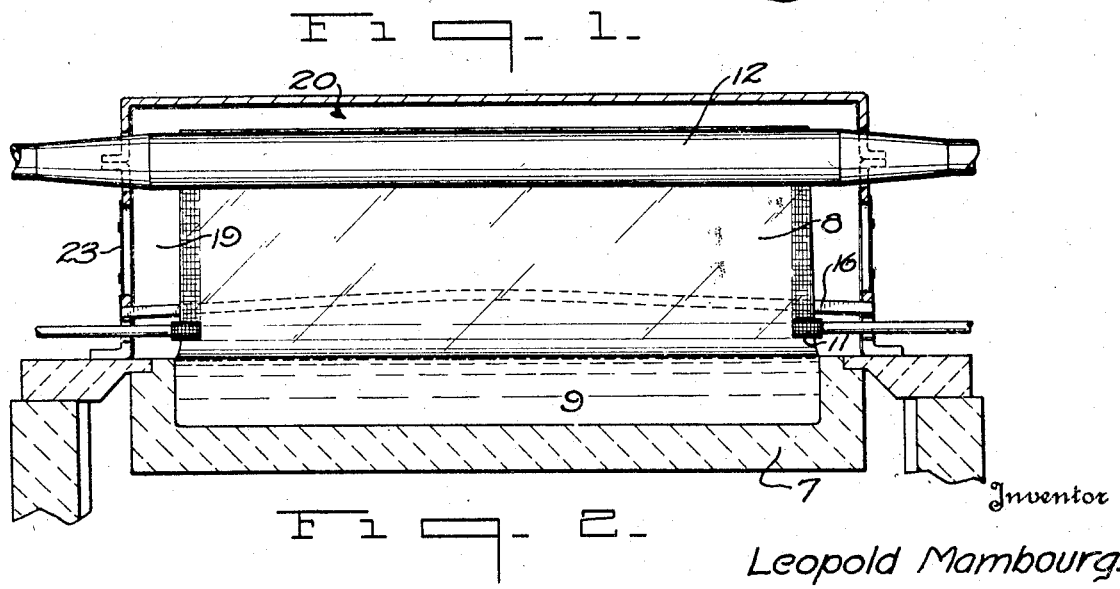

In the drawings wherein like numerals are employed to designate like parts throughout the same, Fig. 1 is a vertical longitudinal section through a sheet glass drawing machine constructed in accordance with the present invention, and Fig. 2 is a vertical transverse section therethrough.

In the drawings, the numeral 5 designates the exit end of a tank furnace containing a mass of molten glass 6 which is continuously supplied to a draw pot or similar receptacle 7.

A sheet of glass 8 may be continuously drawn from the molten mass 9 in said pot by the drawing means 10. Edge engaging means 11 are provided to prevent narrowing of the sheet, while the said sheet is deflected over a suitable member 12 in its travel from its source 13 to the draw table 10. The base of the sheet 13 is preferably arranged relatively close to the closed end 14 of the pot, while the inner surface of said pot is curved as at 15 to prevent an accumulation of stagnant glass in the closed end thereof.

In my copending application, filed of even date herewith, now Patent 1,759,235, is disclosed means for separating the gases above the glass in the tank furnace from the gases above the glass in the draw pot, and also discloses means for protecting the surface of the molten glass in the draw pot, as well as the base of the sheet, from the atmosphere.

This construction includes, briefly, hood means 16 and 17 arranged over and adapted to cover and protect the surface of the molten glass 9, as well as the sheet source 13. These hoods may be formed from any suitable material, but I prefer a metal because metals are cleaner than clays, although of course the invention is not dependent upon the specific material used. Depending from the hood 16 is a baffle wall 18 having its lower end preferably dipped in the molten glass, the baffle wall being arranged substantially at the juncture of the draw pot and tank furnace. The baffle wall, as disclosed, gives an effective means for separating the gases over the draw pot and over the tank furnace so that any desirable condition can be set up at either place without one condition disturbing or affecting the other. Thus, a relatively high temperature can be maintained in the tank furnace and a relatively low temperature had over the draw pot. This is a contrast to prior art constructions wherein it was necessary to strike a medium between the desired temperatures at both ends.

In carrying out the present invention, means are provided for protecting the sheet from the atmosphere until it reaches the draw table 10. To accomplish this, suitable metallic plates or the like 19 are coupled together to form an enclosed compartment 20 extending around the sheet 8. The walls 19 are arranged in spaced relation to the sheet and effectively permit the formation and setting of a sheet in a temperature controlled compartment. The end 21 may be hinged as at 22. It will be seen that the ends of the tunnel like structure converge so that the exit is normally smaller than the width of the compartment. By adjusting the end 21, the desired pressure can be set up around the sheet during its formative and setting periods.

Windows 23 may be provided to permit an inspection of the sheet, while heat absorbing means 24, designated in dotted lines, may be used if desired.

I have found in actual practice that the slightest change in temperature conditions has a considerable bearing on the quality of sheet produced so that it becomes necessary to be constantly changing conditions to compensate for atmospheric changes. By entirely enclosing the molten mass from which the sheet is produced, the sheet during its formative period, and the sheet during its setting period, troubles from atmospheric changes will be reduced to a minimum, so that a desired condition can be set up and maintained for a considerable length of time.

It is well known in the art, and generally accepted, that the best glass finish obtainable is a fire finish or polish. The numerals 25 indicate suitable gas burners adapted to create flames 26 directed preferably at the base 13 of the sheet 8. The flame 26 is purely a fire polishing flame and is preferably a soft, mellow flame which is permitted to lightly touch the surface of the molten glass and to follow with the sheet. In other words, the flame is not what is known as a heating flame produced by a considerable amount of air mixed with the gas, but on the other hand is a flame composed chiefly of gas. As indicated, generally the flame laps against the sheet and follows around its source, and preferably a considerable distance with the sheet in its vertical draw. Another advantage of this type of flame is the fact that a considerable amount of carbon will be formed and a deposit of carbon will preferably be formed on the bending roll 12 and idler roll 27. A carbon deposit is very desirable as it forms a protecting film between the polished surface of the glass and the surfaces of the rolls. Of course, any number of such flames may be directed against the surface of the molten glass or the sheet after it has been formed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, the combination with a receptacle containing a mass of molten glass, means for drawing a sheet vertically therefrom and means for deflecting the sheet from the vertical into the horizontal plane, of hood means arranged over and adapted to cover the mass of molten glass in the receptacle, and a closed compartment carried by the hood means and having a vertical portion and a horizontal portion for enclosing the vertical and horizontal portions respectively of the sheet being drawn, the horizontal portion of said compartment tapering towards its exit end and having a hinged end portion for varying the size of the exit end of said compartment.

2. In sheet glass apparatus, a tank furnace containing a mass of molten glass, a relatively shallow draw pot connected to and in open communication with said furnace for receiving the molten glass therefrom, means for drawing a sheet vertically from the glass in said draw pot including a horizontally traveling draw table, a rotatable member for deflecting the sheet through an angle of approximately 90° from the vertical into the horizontal plane, hood means arranged over and adapted to cover the molten glass in the draw pot, and a closed compartment carried by the hood means and having a vertical portion and a horizontal portion extending at substantially right angles with respect to said vertical portion for enclosing the vertical and horizontal portions respectively of the sheet being drawn, the horizontal portion of said compartment terminating in advance of but closely adjacent to the draw table.

3. In sheet glass apparatus, a tank furnace containing a mass of molten glass, a relatively shallow draw pot connected to and in open communication with said furnace for receiving the molten glass therefrom, means for drawing a sheet vertically from the glass in said draw pot including a horizontally traveling draw table, a rotatable member for deflecting the sheet through an angle of approximately 90° from the vertical into the horizontal plane, hood means arranged over and adapted to cover the molten glass in the draw pot, and a closed compartment carried by the hood means and having a vertical portion and a horizontal portion extending at substantially right angles with respect to said vertical portion for enclosing the vertical and horizontal portions respectively of the sheet being drawn, the horizontal portion of said compartment tapering towards its exit end and terminating in advance of but closely adjacent to the draw table, said horizontal portion of the compartment having a movable part for varying the size of the exit end of said compartment.

4. In sheet glass apparatus, a tank furnace containing a mass of molten glass, a relatively shallow draw pot connected to and in open communication with said furnace for receiving the molten glass therefrom, means for drawing a sheet vertically from the glass in said draw pot including a horizontally traveling draw table, a rotatable member for deflecting the sheet through an angle of approximately 90° from the vertical into the horizontal plane, hood means arranged over and adapted to cover the molten glass in the draw pot, a closed compartment carried by the hood means and having a vertical portion and a horizontal portion extending at substantially right angles with respect to said vertical portion for enclosing the vertical and horizontal portions respectively of the sheet being drawn, the horizontal portion of said compartment terminating in advance of but closely adjacent to the draw table, and a depending baffle wall carried by the hood means and dipping downwardly into the mass of molten glass at substantially the juncture of the furnace and draw pot.

5. In sheet glass apparatus, a tank furnace containing a mass of molten glass, a relatively shallow draw pot connected to and in open communication with said furnace for receiving the molten glass therefrom, means for drawing a sheet vertically from the glass in said draw pot including a horizontally traveling draw table, a rotatable member for deflecting the sheet through an angle of approximately 90° from the vertical into the horizontal plane, hood means arranged over and adapted to cover the molten glass in the draw pot, a closed compartment carried by the hood means and having a vertical portion and a horizontal portion extending at substantially right angles with respect to said vertical portion for enclosing the vertical and horizontal portions respectively of the sheet being drawn, the horizontal portion of said compartment tapering towards its exit end and terminating in advance of but closely adjacent to the draw table, said horizontal portion of the compartment having a movable part for varying the size of the exit end of said compartment, and a depending baffle wall carried by the hood means and dipping downwardly into the mass of molten glass at substantially the juncture of the furnace and draw pot.

Signed at Lancaster, in the county of Fairfield and State of Ohio, this 11th day of September, 1926.

LEOPOLD MAMBOURG.